No. 635,877. Patented Oct. 31, 1899.
C. A. SPENCE.
BRIDLE BIT.
(Application filed Mar. 13, 1899.)

(No Model.)

Witnesses

Inventor
Charles A Spence.
by his Attorneys

THE NORRIS PETERS CO., PHOTO-LITHO., WASHINGTON, D. C.

UNITED STATES PATENT OFFICE.

CHARLES A. SPENCE, OF ASSUMPTION, ILLINOIS.

BRIDLE-BIT.

SPECIFICATION forming part of Letters Patent No. 635,877, dated October 31, 1899.

Application filed March 13, 1899. Serial No. 708,924. (No model.)

*To all whom it may concern:*

Be it known that I, CHARLES A. SPENCE, a citizen of the United States, residing at Assumption, in the county of Christian and State of Illinois, have invented certain new and useful Improvements in Bridle-Bits; and I do hereby declare the following to be a full, clear, and exact description of the invention, such as will enable others skilled in the art to which it appertains to make and use the same.

This invention relates to bridle-bits of the class comprising a relatively-fixed bar and movable bars pivotally connected with the fixed bar and controlled by the lines, so as to curb a fractious animal having a hard mouth.

The object of the invention is the provision of a bit of this character which will involve a simple and inexpensive construction, which will operate in a positive manner to force the jaws of the animal apart and cause it to release the bit when grasped between the teeth, and which will be effective and insure the control and subjection of an otherwise unruly and fractious animal.

The improvement consists of a bit or mouthpiece comprising three bars, two of the bars having the lines or reins attached thereto and pivoted near their outer ends to the end portion of the third bar and having their inner end portions overlapped.

The improvement also consists of the novel features and details of construction which hereinafter will be more particularly described, illustrated, and finally claimed.

Figure 1:
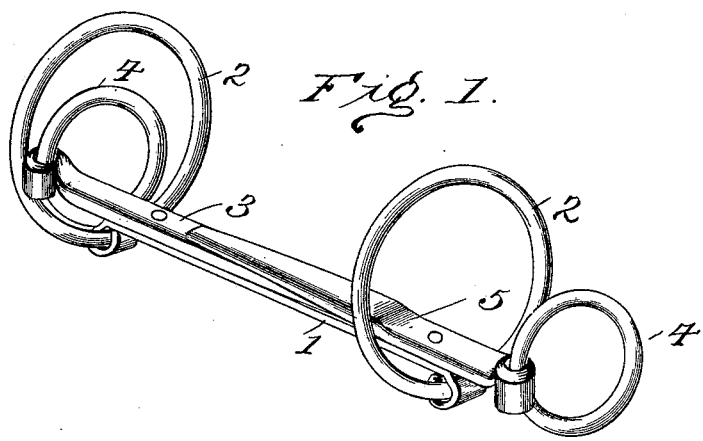
Figure 2:
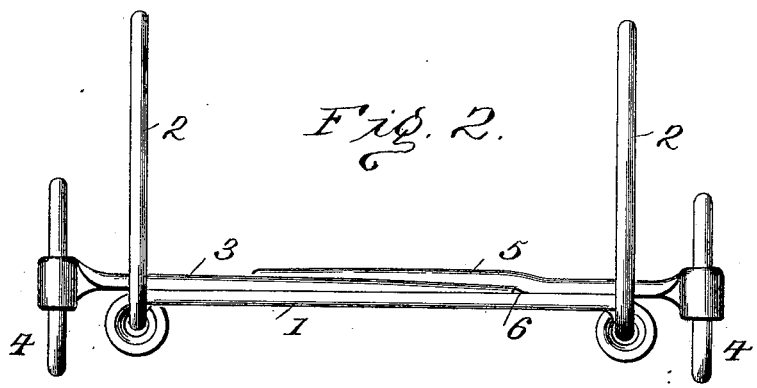
Figure 3:
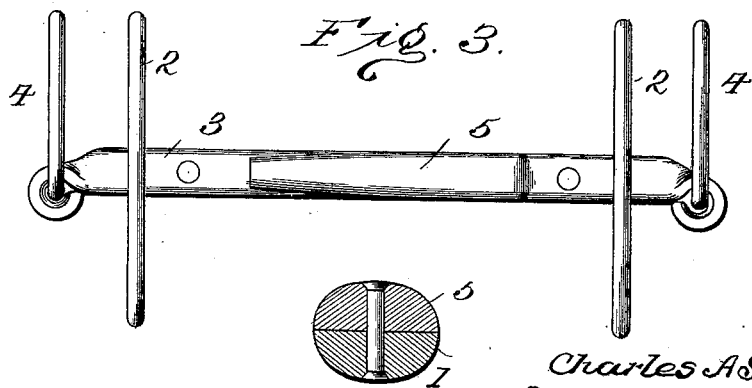

In the drawings, Figure 1 is a perspective view of a bridle-bit constructed in accordance with and embodying the features of the invention. Fig. 2 is a top plan view thereof. Fig. 3 is a front view, the dotted lines showing the operation of the line-bars.

Corresponding and like parts are referred to in the following description and indicated in all the views of the drawings by the same reference characters.

The bar 1 is rigid and relatively fixed and is provided at its ends with rings 2 for attachment therewith of the head-stall and overdraw in the usual manner. A bar 3 is pivoted near its outer end to the bar 1, adjacent to one end, and is provided with a ring 4, to which the rein or drive-line is attached. The inner end of the bar 3 falls short of the opposite end of the bar 1 and is made tapering to prevent the middle portion of the bit, which is composed of three layers, from being excessively thick. A bar 5 is pivoted a short distance from its outer end to the opposite end portion of the bar 1, and its inner end overlaps the inner end portion of the bar 3, a jog or offset 6 being formed therein, so as to enable the overlapping portion to clear the inner extremity of the pivoted line-bar 3. A ring 4 is provided at the outer end of the bar 5 and receives the rein or line. The overlapping portion of the bar 5 is made tapering or decreases in thickness toward the extremity to correspond with the tapering end portion of the bar 3, whereby the middle portion of the bit may be of a minimum size.

The several bars are formed of half-round iron or other suitable material and are placed with their flat sides or faces touching and with the half-round sides outward, whereby the bit in cross-section presents an approximately circular outline, thereby obviating injury to the animal. The short arms of the pivot or line bars 3 and 5 project beyond the extremities of the fixed bar 1 and are given a quarter-turn and bent to provide eyes in which the rings 4 are fitted.

The driving lines or reins are attached to the rings 4, and in the event of the animal taking the bit between its teeth and becoming unruly a strong pull upon the lines will cause the line-bars to turn upon their pivots and their long arms to move outward from the bar 1 and forcibly separate the jaws and cause the animal to release the bit and enable the driver to bring the horse into subjection and under control.

The invention can be applied to any style or form of bit, and in such adaptation it is to be understood that various changes in the form, proportion, and minor details of construction may be resorted to without departing from or sacrificing any of the advantages of the invention.

Having thus described the invention, what is claimed as new is—

1. A bridle-bit composed of three separate and independent bars, two of the bars being pivoted near their outer ends to the extremities of the third bar and having their inner end portions overlapped and adapted to have the lines applied to their outer ends, substantially as described.

2. A bridle-bit comprising three separate and independent bars, two of the bars being pivoted near their outer ends to the terminal portions of the third bar and having their inner end portions correspondingly tapered and overlapped and having their outer end portions projecting beyond the extremities of said third bar and adapted to have the reins applied thereto, substantially as set forth.

3. A bridle-bit comprising a relatively-fixed bar having rings at its ends, two bars pivoted near their ends to the extremities of the fixed bar and having their inner end portions overlapped and tapering, one of the pivoted bars having a jog or offset, and rings applied to the outer extremities of the pivoted bars, substantially as specified.

4. A bridle-bit comprising a half-round bar provided at its ends with rings, two other half-round bars placed with their flat sides against the flat face of the first-mentioned bar and pivoted to the latter near their outer ends and having their inner end portions overlapped and made tapering, one of the pivoted bars being formed with a jog or offset, and rings applied to the outer extremities of the pivoted bars, substantially as described.

In testimony whereof I affix my signature in presence of two witnesses.

CHARLES A. SPENCE. [L. S.]

Witnesses:
JAMES PADGETT,
FRANK GANDY.